(12) United States Patent
Lee et al.

(10) Patent No.: US 11,947,743 B2
(45) Date of Patent: Apr. 2, 2024

(54) APPARATUS AND METHOD FOR CONTROLLING A POINTER ON A SCREEN OF AN ELECTRONIC DEVICE

(71) Applicant: Razer (Asia-Pacific) Pte. Ltd., Singapore (SG)

(72) Inventors: Kah Yong Lee, Singapore (SG); Shyh Lai Long, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 18/020,250

(22) PCT Filed: Aug. 18, 2020

(86) PCT No.: PCT/SG2020/050479
§ 371 (c)(1),
(2) Date: Feb. 7, 2023

(87) PCT Pub. No.: WO2022/039664
PCT Pub. Date: Feb. 24, 2022

(65) Prior Publication Data
US 2023/0305645 A1    Sep. 28, 2023

(51) Int. Cl.
*G06F 3/0354* (2013.01)
*G06F 3/038* (2013.01)

(52) U.S. Cl.
CPC ........ *G06F 3/03543* (2013.01); *G06F 3/0383* (2013.01); *G06F 2203/0384* (2013.01)

(58) Field of Classification Search
None
See application file for complete search history.

(56) References Cited

U.S. PATENT DOCUMENTS

| 5,298,918 A | 3/1994 | Yen-chen et al. |
| 7,050,798 B2 | 5/2006 | Ranta |

(Continued)

FOREIGN PATENT DOCUMENTS

| CN | 101498969 B | 12/2010 |
| CN | 102262460 B | 5/2013 |

(Continued)

OTHER PUBLICATIONS

Antoine et al., Using High Frequency Accelerometer and Mouse to Compensate for End-to-end Latency in Indirect Interaction. HAL Open Science, Feb. 21, 2018.

(Continued)

*Primary Examiner* — Matthew Yeung
(74) *Attorney, Agent, or Firm* — Polsinelli PC

(57) ABSTRACT

An apparatus for controlling a pointer on a screen of an electronic device may include a receiver device and a wireless input device. The input device may include a sensing unit configured to detect the input device's movement; a position determination unit configured to determine the input device's current position based on the detected movement; a prediction unit configured to predict the input device's current position; a comparison unit configured to determine a difference between the determined and predicted positions, and whether the difference is greater than a similarity threshold; and a transmitting unit configured to transmit the determined position to the receiver device in response to determining that the difference is greater than the similarity threshold. The receiver device may include a receiving unit configured to receive the determined current position and a communication unit configured to communicate this received position to the electronic device to control the pointer.

21 Claims, 9 Drawing Sheets

(56) References Cited

U.S. PATENT DOCUMENTS

| | | | |
|---|---|---|---|
| 7,292,225 B2 | 11/2007 | Gordon et al. | |
| 7,425,945 B2 | 9/2008 | Arrigo et al. | |
| 7,466,305 B2 | 12/2008 | Lin et al. | |
| 8,078,779 B2* | 12/2011 | Lin | G06F 3/038 710/73 |
| 8,213,865 B2 | 7/2012 | Jensen | |
| 2007/0000584 A1 | 1/2007 | Reynolds et al. | |
| 2007/0027365 A1 | 2/2007 | Kosted et al. | |
| 2009/0189860 A1 | 7/2009 | Su et al. | |
| 2010/0030912 A1 | 2/2010 | Finkenzeller et al. | |
| 2013/0021272 A1 | 1/2013 | Wang | |
| 2014/0108994 A1 | 4/2014 | Medlock et al. | |
| 2015/0091832 A1* | 4/2015 | Mizunuma | G06F 3/03545 345/173 |
| 2015/0301617 A1 | 10/2015 | Walley et al. | |
| 2016/0041689 A1* | 2/2016 | Yumoto | G06F 3/0446 345/174 |
| 2019/0181909 A1 | 6/2019 | Lee | |
| 2020/0201453 A1 | 6/2020 | Lee | |

FOREIGN PATENT DOCUMENTS

| | | |
|---|---|---|
| EP | 0910006 A2 | 4/1999 |
| JP | 10-340155 A | 12/1998 |
| KR | 10-0812998 B1 | 3/2008 |

OTHER PUBLICATIONS

Polymovial—mouse pointer movement learning and prediction. https://github.com/pavlobaron/polymovial (Jun. 1, 2020).

International Patent Application No. PCT/SG2020/050479; International Search Report and Written Opinion dated May 11, 2021; 6 pgs.

European Search Report, EP20950431, dated Aug. 14, 2023, 13 pages.

* cited by examiner

APPARATUS AND METHOD FOR CONTROLLING A POINTER ON A SCREEN OF AN ELECTRONIC DEVICE

TECHNICAL FIELD

Various embodiments generally relate to apparatuses for controlling a pointer on a screen of an electronic device. In particular, various embodiments generally relate to apparatuses including a wireless input device (such as a mouse) and a receiver device (such as a dongle) communicable with the electronic device.

BACKGROUND

There are many ways a user can interact with an electronic device (e.g. a computer). One way is to control a pointer on a screen of the electronic device to, for example, select files or applications to be executed. The pointer is typically controlled using one or more human interface devices (HIDs).

FIG. 1 shows a prior art example of an apparatus 100 that can be employed by a user to interact with a computer 102. As shown in FIG. 1, the apparatus 100 includes HIDs in the form of a wireless mouse 104 and a dongle 106. The dongle 106 can be connected to the computer 102 (via for example, a USB port) and the mouse 104 can communicate wirelessly with the dongle 106. In particular, the mouse 104 may transmit user input data indicating a change in the state of the mouse 104 (e.g. movement of the mouse 104 or clicking of one or more buttons of the mouse 104) to the dongle 106. This transmission may be via radio frequency, infra-red or any other type of wireless medium. The dongle 106 may then communicate such user input data to the computer 102 to carry out the user's desired tasks.

Transmission of user input data from the mouse 104 to the dongle 106 typically begins upon detecting a change in the state of the mouse 104, and the user input data is usually transmitted repeatedly (or in other words, periodically) over a time interval after such detection. FIG. 2 shows an example transmission of user input data from the mouse 104 to the dongle 106. As shown in FIG. 2, after detecting a change in the state of the mouse 104 at time 204, the user input data may be repeatedly transmitted to the dongle 106 in the form of data packets 202a, 202b, 202c. Each data packet 202a, 202b, 202c is then communicated to the computer 102. The time period 206 between consecutive transmissions of the data packets 202a, 202b, 202c may be for example, 1 ms. This time period 206 may be referred to as a universal serial bus start of frame (USB SOF) interval and the wireless transmission of the user input data may be considered as being synchronized to the USB SOF interval.

Wireless transmission of user input data from the mouse 104 to the dongle 106 is often susceptible to wireless interference. In a noisy environment, retransmission of the user input data is often required to improve the integrity of the data received by the dongle 106. FIG. 3 shows another example transmission of user input data from the mouse 104 to the dongle 106. The transmission of the user input data shown in FIG. 3 is similar to that shown in FIG. 2, except that due to wireless interference, the transmission of the packet 202b from the mouse 104 to the dongle 106 is unsuccessful. Upon detection of such unsuccessful transmission, the user input data may be retransmitted from the mouse 104 to the dongle 106 in the form of a data packet 302. As shown in FIG. 3, the data packet 302 may be communicated to the computer 102 at around a same time as the communication of the next data packet 202c to the computer 102.

The periodic and rapid transmission of the user input data from the mouse 104 to the dongle 106 usually consumes a huge amount of power. As a result, the batteries of the mouse 104 have to be changed or recharged frequently. This issue is worsened if the mouse 104 and the dongle 106 are operated in a noisy environment as such operations usually involve a greater number of retransmissions of the user input data. Accordingly, there is a need for an improved apparatus and method that can allow the mouse (or any other similar wireless input device) to be used for a longer period of time without changing or recharging its batteries.

SUMMARY

According to various embodiments, there may be provided an apparatus for controlling a pointer on a screen of an electronic device, including: a receiver device communicable with the electronic device and including a receiving unit and a communication unit; and a wireless input device including: a sensing unit configured to detect movement of the wireless input device; a position determination unit configured to determine a current position of the wireless input device in a current time instance based on the detected movement; a prediction unit configured to predict the current position of the wireless input device in the current time instance; a comparison unit configured to determine a difference between the determined current position and the predicted current position of the wireless input device, and further configured to determine if the difference is greater than a similarity threshold; and a transmitting unit configured to transmit the determined current position of the wireless input device to the receiver device in response to determining that the difference between the determined current position and the predicted current position of the wireless input device is greater than the similarity threshold; wherein the receiving unit of the receiver device may be configured to receive the determined current position of the wireless input device and the communication unit of the receiver device may be configured to communicate the received current position of the wireless input device to the electronic device to control the pointer on the screen of the electronic device.

According to various embodiments, there may be provided a wireless input device communicable with a receiver device, wherein the receiver device may be communicable with an electronic device and wherein the wireless input device may include: a sensing unit configured to detect movement of the wireless input device; a position determination unit configured to determine a current position of the wireless input device in a current time instance based on the detected movement; a prediction unit configured to predict the current position of the wireless input device in the current time instance; a comparison unit configured to determine a difference between the determined current position and the predicted current position of the wireless input device, and further configured to determine if the difference is greater than a similarity threshold; and a transmitting unit configured to transmit the determined current position of the wireless input device to the receiver device in response to determining that the difference between the determined current position and the predicted current position of the wireless input device is greater than the similarity threshold.

According to various embodiments, there may be provided a receiver device communicable with a wireless input device and an electronic device, wherein the receiver device may include: a receiving unit configured to receive a current position of the wireless input device from the wireless input device; a communication unit configured to communicate the received current position of the wireless input device to the electronic device; a data detection unit configured to determine if a subsequent position of the wireless input device in a subsequent time instance is received by the receiving unit from the wireless input device; and a predictor unit configured to predict the subsequent position of the wireless input device in the subsequent time instance; wherein in response to determining an absence of the receipt of the subsequent position of the wireless input device, the communication unit may be configured to communicate the predicted subsequent position of the wireless input device to the electronic device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Figure 1:
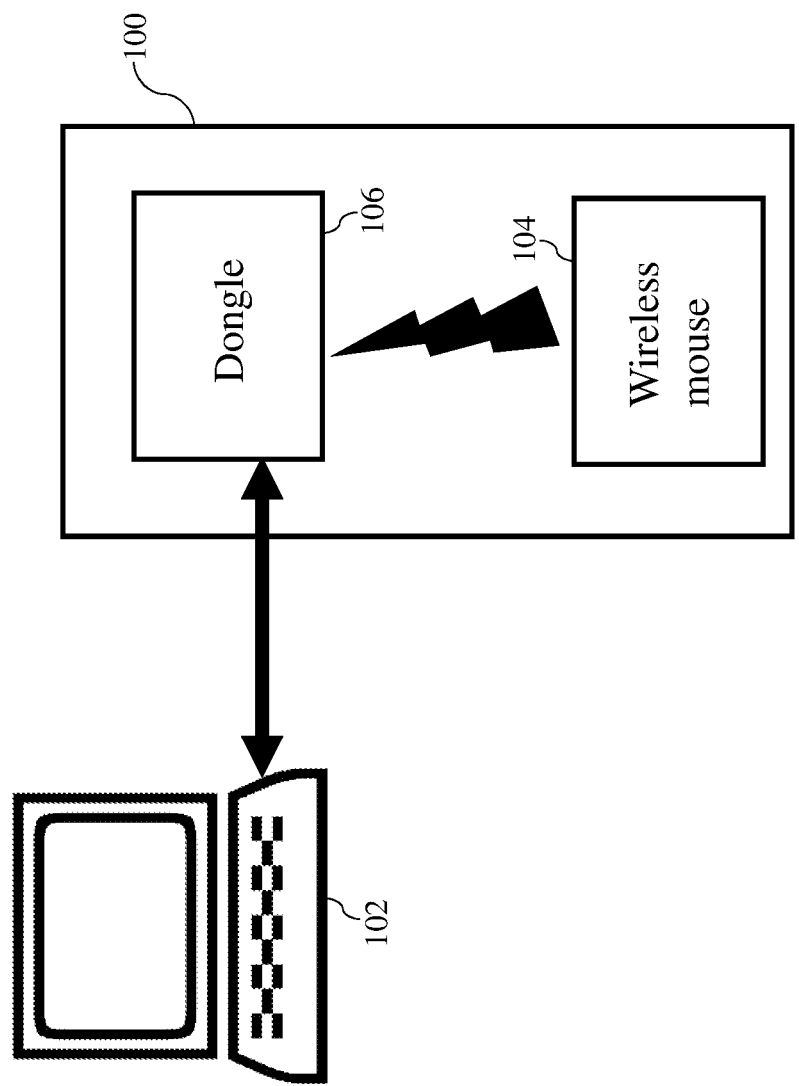
FIG. 1 shows a prior art example of an apparatus 100 including a mouse and a dongle that can be employed by a user to interact with a computer.
Figure 2:
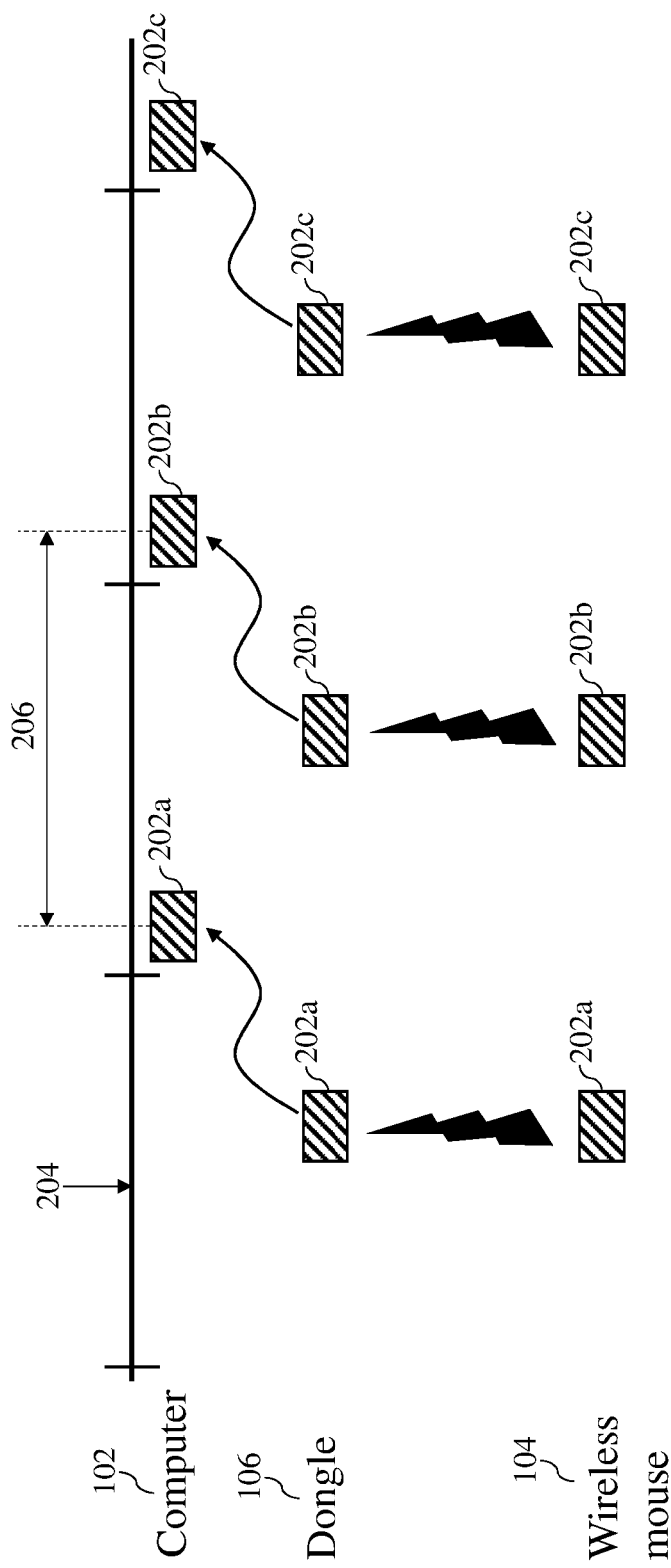
FIG. 2 shows an example transmission of user input data from the mouse to the dongle of FIG. 1.
Figure 3:
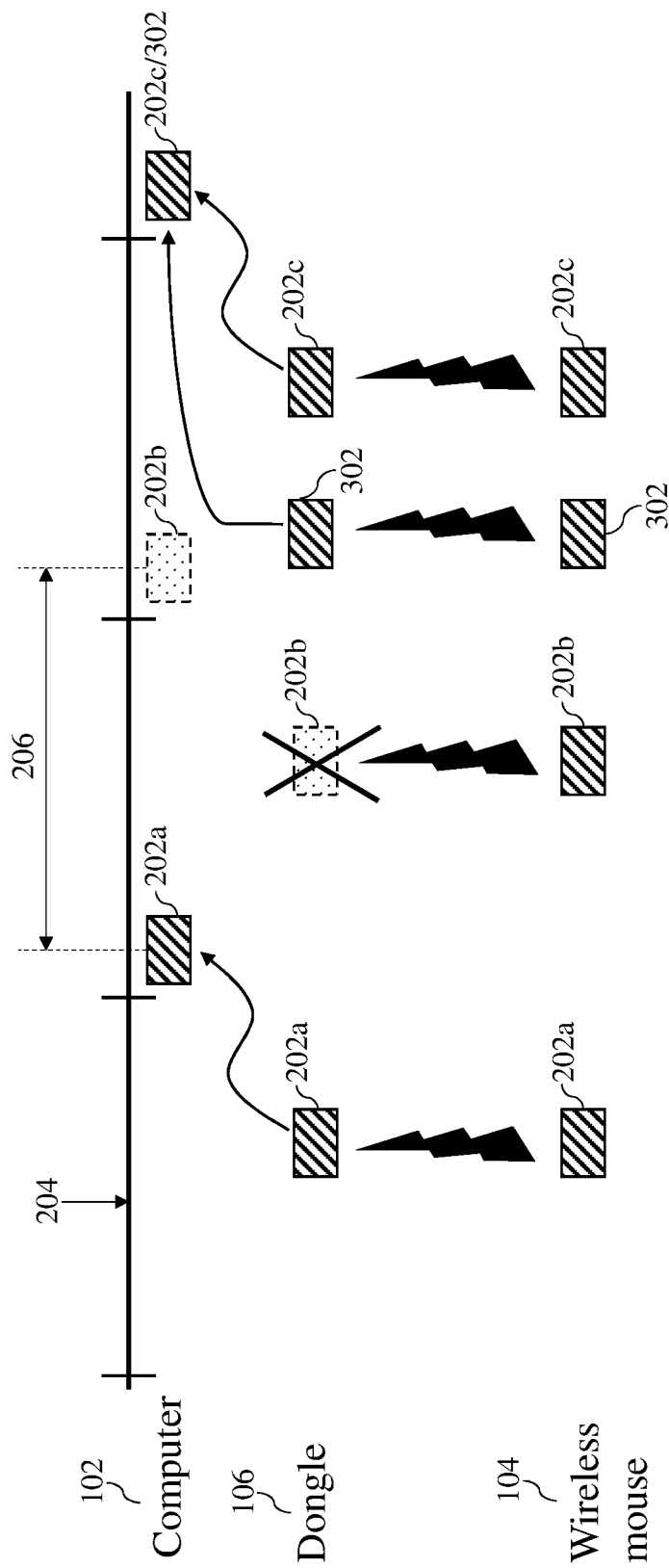
FIG. 3 shows another example transmission of user input data from the mouse to the dongle of FIG. 1.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Embodiments described below in the context of the device are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

It should be understood that the singular terms "a", "an", and "the" include plural references unless context clearly indicates otherwise. Similarly, the word "or" is intended to include "and" unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the invention may be readily understood and put into practical effect, various embodiments will now be described by way of examples and not limitations, and with reference to the figures.

According to various embodiments, an apparatus for controlling a pointer on a screen of an electronic device may be provided. The apparatus may include a wireless input device and a receiver device. The wireless input device may determine its position using a sensing unit therein, and may also predict its position. If the determined and predicted positions are significantly different, the wireless input device may transmit the determined position to the receiver device that may then communicate this position to the electronic device to control the pointer. On the other hand, if the determined and predicted positions are sufficiently similar, the wireless input device may not transmit the determined position to the receiver device. The receiver device may also predict a position of the wireless input device and if no data is received from the wireless input device, the receiver device may communicate this predicted position to the electronic device to control the pointer. Such an apparatus can consume less power (therefore extending the battery life of the wireless input device) without compromising the user experience.

Figure 4:
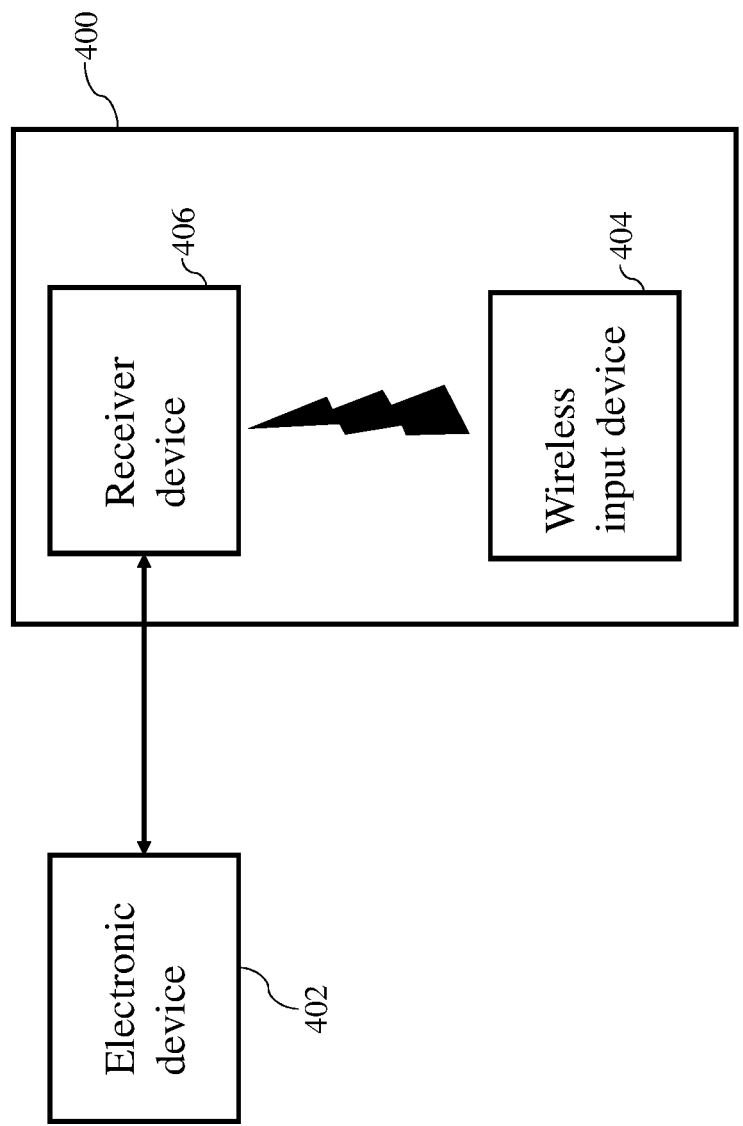
FIG. 4 shows a schematic diagram of an apparatus for controlling a pointer on a screen of an electronic device according to various embodiments.

FIG. 4 shows a schematic diagram of an apparatus 400 for controlling a pointer on a screen of an electronic device 402 according to various embodiments. The electronic device 402 may be a desktop computer, a notebook computer, a tablet or any other electronic device as known to those skilled in the art. As shown in FIG. 4, the apparatus 400 may include a wireless input device 404 and a receiver device 406.

Figure 5:
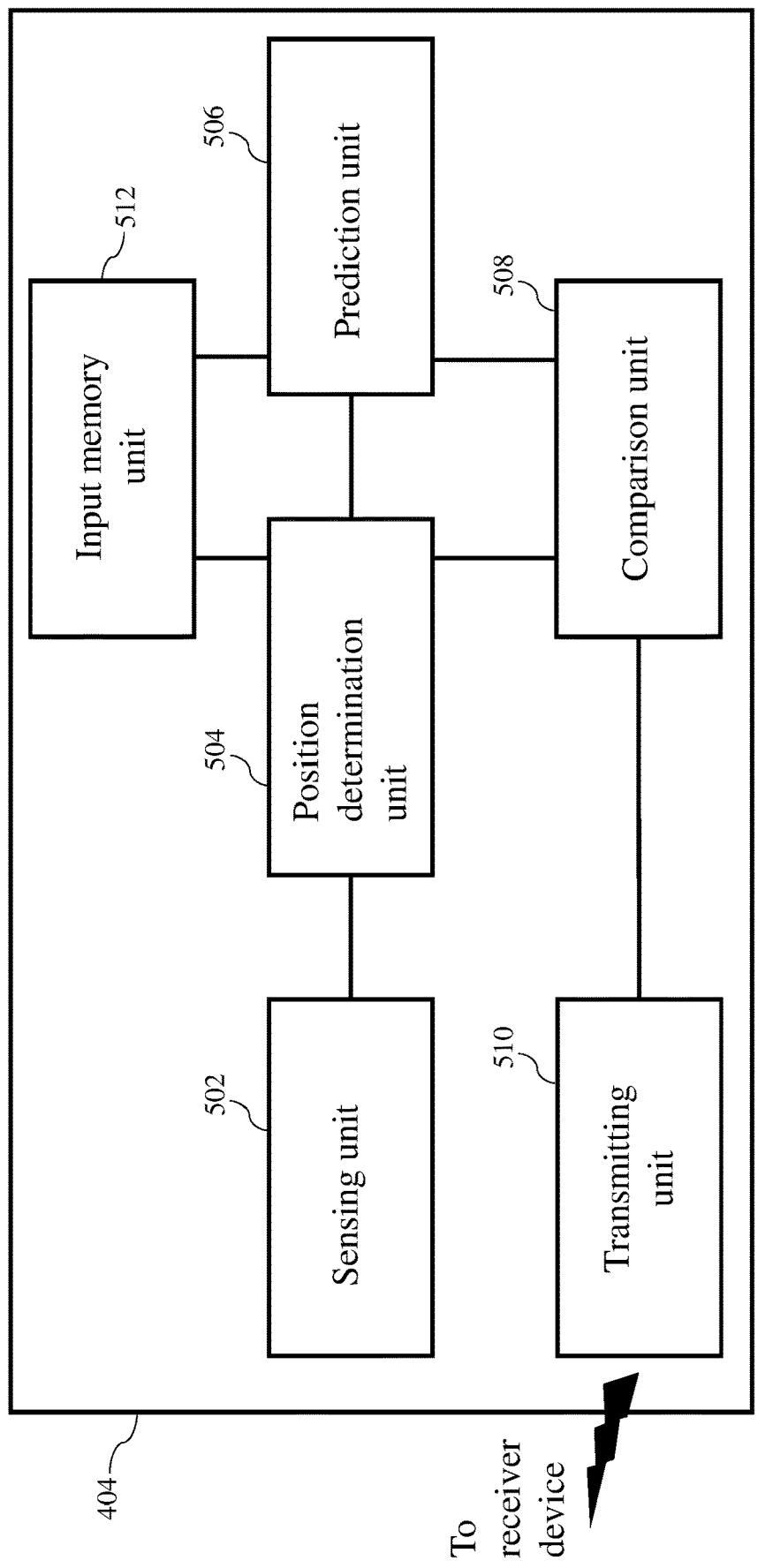
FIG. 5 shows a schematic diagram of a wireless input device of the apparatus of FIG. 4 according to various embodiments.

FIG. 5 shows a schematic diagram of the wireless input device 404 according to various embodiments. The wireless input device 404 may be communicable with the receiver device 406 (in other words, may be able to transmit and receive data to and from the receiver device 406). In various embodiments, the wireless input device 404 may be any type of wireless input HID device as known to those skilled in the art such as, but not limited to, a wireless mouse or a wireless pointer.

As shown in FIG. 5, the wireless input device 404 may include a sensing unit 502 configured to detect movement of the wireless input device 404. The sensing unit 502 may include a light-emitting diode and a light detector, or any other type of sensors as known to those skilled in the art.

The wireless input device 404 may further include a position determination unit 504 configured to determine a position of the wireless input device 404 based on the detected movement. In addition, the wireless input device 404 may include a prediction unit 506 configured to predict the position of the wireless input device 404. The position may be in the form of a two-dimensional data point that may include x,y coordinates.

A comparison unit 508 may be included in the wireless input device 404 and configured to compare the predicted position (from the prediction unit 506) against the determined position (from the position determination unit 504). As shown in FIG. 5, the wireless input device 406 may also include a transmitting unit 510 configured to transmit data to the receiver device 406.

Further, an input memory unit 512 may also be included in the wireless input device 404. In some embodiments, the input memory unit 512 may be configured to store each position of the wireless input device 404 determined by the position determination unit 504 and each position of the wireless input device 404 predicted by the prediction unit 506. However, in some alternative embodiments, the input memory unit 512 may be configured to store only the determined positions of the wireless input device 404. The prediction unit 506 of the wireless input device 404 may be configured to retrieve previously stored positions of the wireless input device 404 from the input memory unit 512 and use these previously stored positions to predict the position of the wireless input device 404. However, in some embodiments, the prediction unit 506 may obtain previous positions of the wireless input device 404 in other manners or may predict the position of the wireless input device 404 in an alternative manner. For example, the previous positions of the wireless input device 404 may be stored in the prediction unit 506 in the form of delay elements of a prediction engine. In these embodiments, the input memory unit 512 may be omitted from the wireless input device 404.

Figure 6:
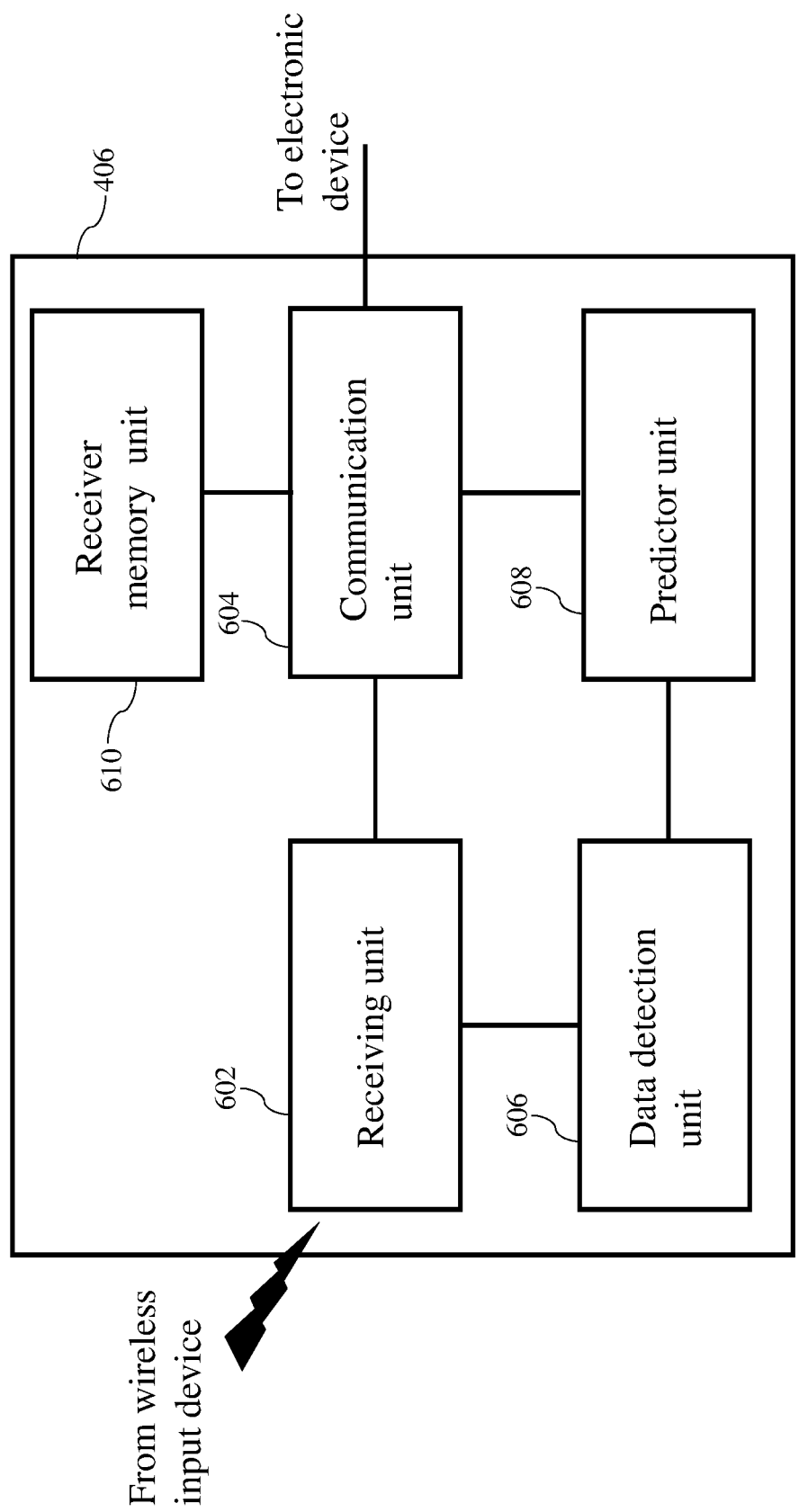
FIG. 6 shows a schematic diagram of a receiver device of the apparatus of FIG. 4 according to various embodiments.

FIG. 6 shows a schematic diagram of a receiver device 406. The receiver device 406 may be communicable with the wireless input device 404 and the electronic device 402. In some embodiments, the receiver device 406 may be a built-in component of the electronic device 402. In alternative embodiments, the receiver device 406 may be external to the electronic device 402 but the receiver device 406 can be connected (in other words, connectable) to the electronic device 402. For example, the receiver device 406 may include a USB plug connectable to the electronic device 402 via the device's 402 USB receptacle. Similarly, the receiver device 406 may be any type of HID device as known to those skilled in the art such as, but not limited to, a dongle.

As shown in FIG. 6, the receiver device 406 may include a receiving unit 602 configured to receive data from the wireless input device 404. The receiver device 406 may further include a communication unit 604 configured to communicate data to the electronic device 402. In addition, the receiver device 406 may include a data detection unit 606 configured to detect presence of data received from the wireless input device 404 and a predictor unit 608 configured to predict the position of the wireless input device 404.

A receiver memory unit 610 may also be included in the receiver device 406 and may be configured to store each position of the wireless input device 404 received by the receiving unit 602 and each position of the wireless input device 404 predicted by the predictor unit 608. However, in some embodiments, the receiver memory unit 610 may be configured to store only the received positions of the wireless input device 404. The predictor unit 608 of the receiver device 406 may be configured to retrieve previously stored positions of the wireless input device 404 from the receiver memory unit 512 and use these previously stored positions to predict the position of the wireless input device 404. However, in some embodiments, the predictor unit 608 may obtain previous positions of the wireless input device 404 in other manners or may predict the position of the wireless input device 404 in an alternative manner. For example, the previous positions of the wireless input device 404 may be stored in the predictor unit 608 in the form of delay elements of a prediction engine. In these embodiments, the receiver memory unit 610 may be omitted from the receiver device 406.

Figure 7A:
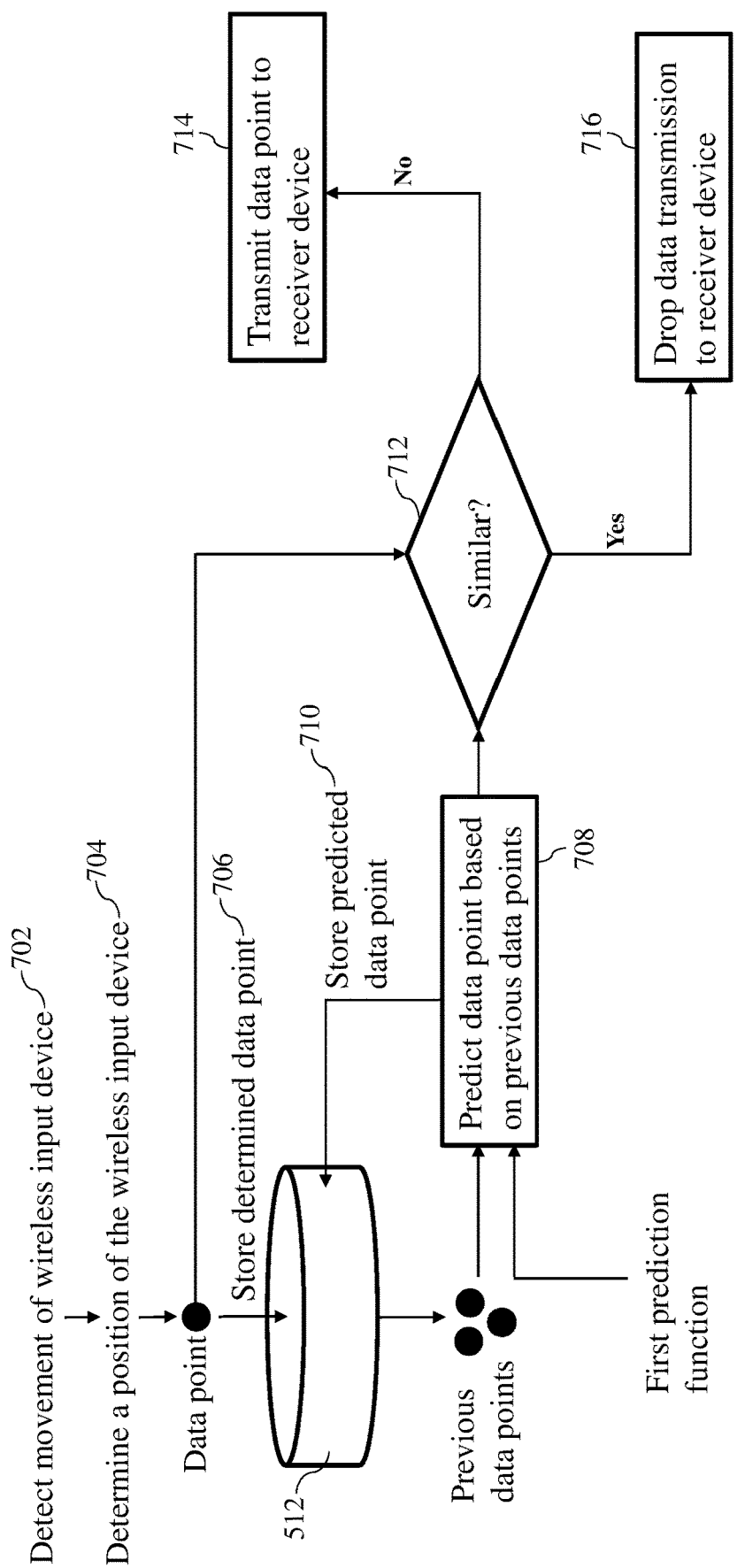
FIG. 7A and FIG. 7B illustrate flow diagrams showing a method for controlling a pointer on a screen of an electronic device according to various embodiments.
Figure 7B:
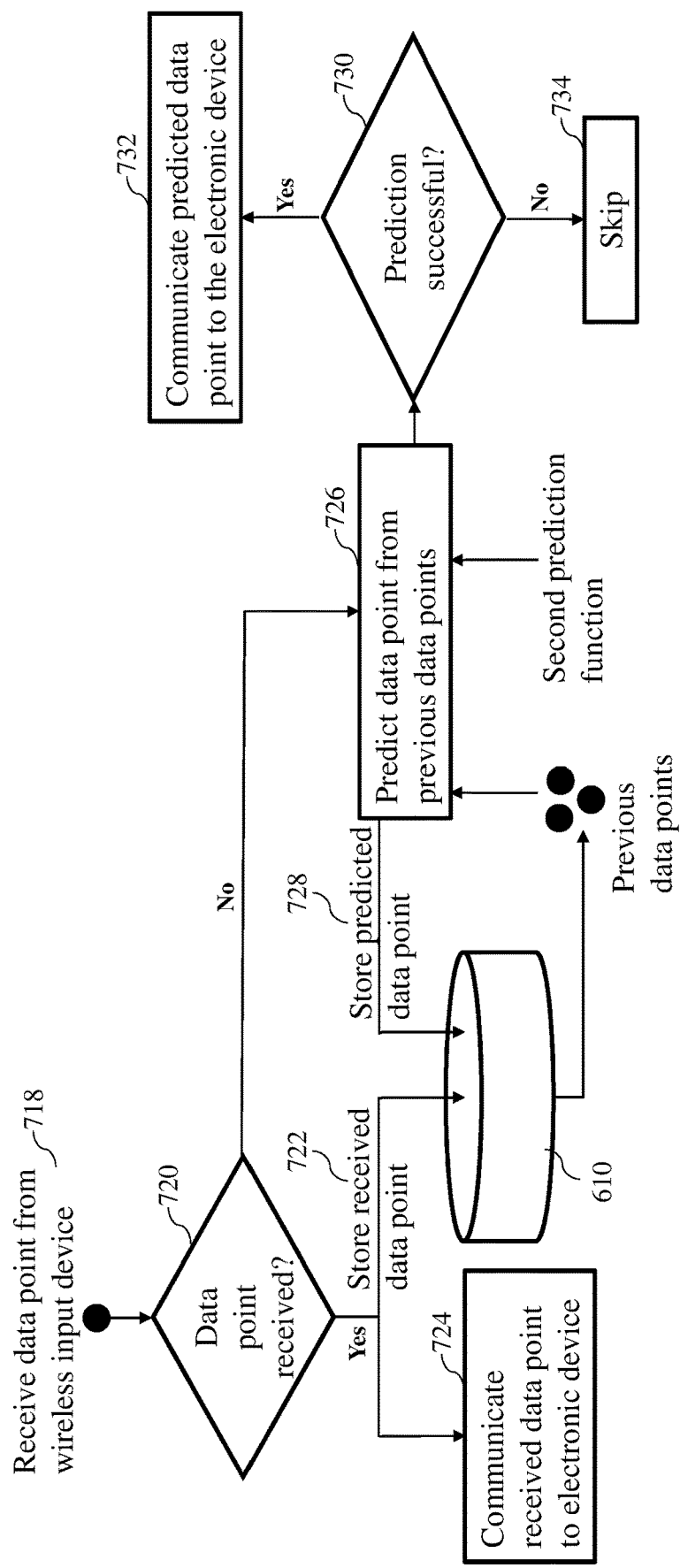

FIG. 7A and FIG. 7B illustrate flow diagrams showing a method for controlling a pointer on a screen of the electronic device 402. In particular, the flow diagram of FIG. 7A shows a first part of the method that may be carried out by the wireless input device 404 and the flow diagram of FIG. 7B shows a second part of the method that may be carried out by the receiver device 406.

Referring to FIG. 7A, at 702, the method may include detecting movement of the wireless input device 404 by the sensing unit 502.

At 704, the method may include determining a current position of the wireless input device 404 (or in other words, a data point) in a current time instance based on the detected movement. This may be carried out by the position determination unit 504.

At 706, the determined current position of the wireless input device 404 may be stored in the input memory unit 512.

At 708, the method may include predicting the current position of the wireless input device 404 in the current time instance using the prediction unit 506. In various embodiments, the prediction unit 506 may predict the current position of the wireless input device 404 based on previous positions of the wireless input device 404 determined by the position determination unit 504 in a plurality of time instances prior to the current time instance (in other words, previous data points). As shown in FIG. 7A, in some embodiments, the prediction unit 506 may use a first prediction function to predict the current position of the wireless input device 404. For example, the prediction unit 506 may generate parameters of the first prediction function based on the previous positions of the wireless input device 404 determined by the position determination unit 504 (in the time instances prior to the current time instance), and use the first prediction function with these generated parameters to predict the current position of the wireless input device 404 in the current time instance.

At 710, the predicted current position of the wireless input device 404 (in other words, predicted data point) may also be stored in the input memory unit 512. In some embodiments, the prediction unit 506 may retrieve and use one or more previously stored positions (stored in time instances prior to the current time instance) from the input memory unit 512 for predicting the current position of the wireless input device 404. In some embodiments, these previously stored positions may include both previously determined positions as well as previously predicted positions, but in other embodiments, they may include only the previously determined positions.

At 712, a similarity between the predicted current position (from 708) and the determined current position (from 704) of the wireless input device 404 may be determined using the comparison unit 508. In some embodiments, the comparison unit 508 may determine a difference between the determined current position and the predicted current position of the wireless input device 404, and may compare the difference to a similarity threshold and determine if this difference is greater than the similarity threshold. In some embodiments, the similarity threshold may range from about 0.5% to about 1.5% of the determined position, and in one exemplary embodiment, the similarity threshold may be about 1% of the determined position. For example, if the determined position includes coordinates $(x_1, y_1)$ and the predicted position includes coordinates $(x_2, y_2)$, then the similarity threshold may also include an x-component with a value about 1% of $x_1$ and a y-component with a value about 1% of $y_1$. The comparison unit 508 may then determine if the difference between $x_2$ and $x_1$ i.e. $(x_2-x_1)$ is greater than 1% of $x_1$, and whether the difference between $y_2$ and $y_1$ i.e. $(y_2-y_1)$ is greater than 1% of $y_1$. In some embodiments, the comparison unit 508 may consider the difference between the determined and predicted positions greater than the similarity threshold only if both the difference between the x-coordinates of the positions $(x_2-x_1)$ is greater than the x-component of the similarity threshold and the difference between the y-coordinates of the positions $(y_2-y_1)$ is greater than the y-component of the similarity threshold. In alternative embodiments, the comparison unit 508 may consider the difference between the determined and predicted positions greater than the similarity threshold as long as one of the above-mentioned differences is greater than the respective component of the similarity threshold.

At 714, in response to determining that the difference between the determined current position and the predicted current position of the wireless input device 404 is greater than the similarity threshold (in other words, determining that the determined and predicted positions in the current time instance are not sufficiently similar), the transmitting unit 510 may transmit the determined current position of the wireless input device 404 to the receiver device 406.

Referring to FIG. 7B, at 718, the method may include the receiving unit 602 of the receiver device 406 receiving the determined current position of the wireless input device 404 from the transmitting unit 510.

At 720, the method may include determining if a current position of the wireless input device 404 in a current time instance (current data point) is received by the receiving unit 602 from the wireless input device 406. This may be carried out by the data detection unit 606.

At 722, in response to determining a presence of the receipt of the current position of the wireless input device 404, the method may store the received current position in the receiver memory unit 610.

At 724, in response to determining a presence of the receipt of the current position of the wireless input device 404, the method may also include communicating (using the communication unit 604 of the receiver device 406) the received current position of the wireless input device 404 to the electronic device 402 to control the pointer on the screen of the electronic device 402. For example, the received current position of the wireless input device 404 may include two-dimensional (e.g. x,y) coordinates that correspond to a respective pixel on the screen and the pointer may be moved to this pixel on the screen.

702-712 of FIG. 7A as described above may be repeated for a subsequent time instance (with this subsequent time instance considered as the "current time instance" mentioned above). However, at 712, it may be determined that the determined and predicted data points are sufficiently similar, (in other words, the difference between the determined subsequent position and the predicted subsequent position of the wireless input device 404 in the subsequent time instance is less than the similarity threshold). In this case, the method may include dropping (at 716) data transmission to the receiver device 406. Accordingly, contrary to 714 as described above, no data indicating the subsequent position of the wireless input device 404 may be transmitted to the receiver device 406. Thus, neither the determined subsequent position nor the predicted subsequent position of the wireless input device 404 may be transmitted to the receiver device 406.

Similarly, 720 of FIG. 7B as described above may be repeated for the subsequent time instance (with this subsequent time instance considered as the "current time instance" mentioned above). In other words, the method may include determining if the subsequent position of the wireless input device 404 in the subsequent time instance is received by the receiving unit 602 from the wireless input device 404.

At 726, the method may include predicting the subsequent position of the wireless input device 404 in the subsequent time instance using the predictor unit 608 of the receiver device 406. As shown in FIG. 7B, in some embodiments, this may be carried out in response to determining (at 720) an absence of the receipt of the subsequent position of the wireless input device 404. However, in alternative embodiments, this may be carried out regardless of whether a position of the wireless input device 404 is received from the transmitting unit 510. In various embodiments, the predictor unit 608 may predict the subsequent position of the wireless input device 404 based on previous positions of the wireless input device 404 communicated to the electronic device 402 in a plurality of time instances prior to the subsequent time instance. As shown in FIG. 7B, in some embodiments, the predictor unit 608 may use a second prediction function to predict the subsequent position of the wireless input device 404. For example, the predictor unit 608 may generate parameters of the second prediction function based on the previous positions of the wireless input device 404 communicated to the electronic device 402 in the plurality of time instances prior to the subsequent time instance. The predictor unit 608 may further use the second prediction function with these generated parameters to predict the subsequent position of the wireless input device 404 in the subsequent time instance.

At 728, the method may include storing the predicted subsequent position in the receiver memory unit 610. In some embodiments, the predictor unit 608 may retrieve and use one or more previously stored positions (stored in time instances prior to the subsequent time instance) from the receiver memory unit 610 for predicting the subsequent position of the wireless input device 404 at 726. In some embodiments, these previously stored positions may include previously received positions as well as previously predicted positions, but in other embodiments, they may include only the previously received positions.

At 730, the method may include determining if the prediction of the subsequent position of the wireless input device 404 is successful.

At 732, in response to determining that the prediction of the subsequent position of the wireless input device 404 is successful, the communication unit 604 of the receiver device 406 may communicate the predicted subsequent position of the wireless input device 404 to the electronic device 402 to control the pointer on the screen of the electronic device 402. For example, the predicted position of the wireless input device 404 may include two-dimensional (e.g. x,y) coordinates that correspond to a respective pixel on the screen and the pointer may be moved to this pixel on the screen.

At 734, in response to determining that the prediction of the subsequent position of the wireless input device 406 is unsuccessful, the state of the pointer on the screen of the electronic device 402 may remain unchanged. In some embodiments, the communication unit 604 of the receiver device 406 may communicate data to the electronic device 402 where the data may include instructions to the electronic device 402 to maintain the position of the pointer. In some embodiments, no data may be communicated to the electronic device 402 and in the absence of data, the position of the pointer may remain the same.

In some embodiments, the determination of whether the prediction is successful at 730 may be omitted. In these embodiments, in response to determining an absence of the receipt of the subsequent position of the wireless input device 404, the predicted position may be communicated by the communication unit 604 to the electronic device 402 regardless of whether the prediction is considered successful.

Figure 8:
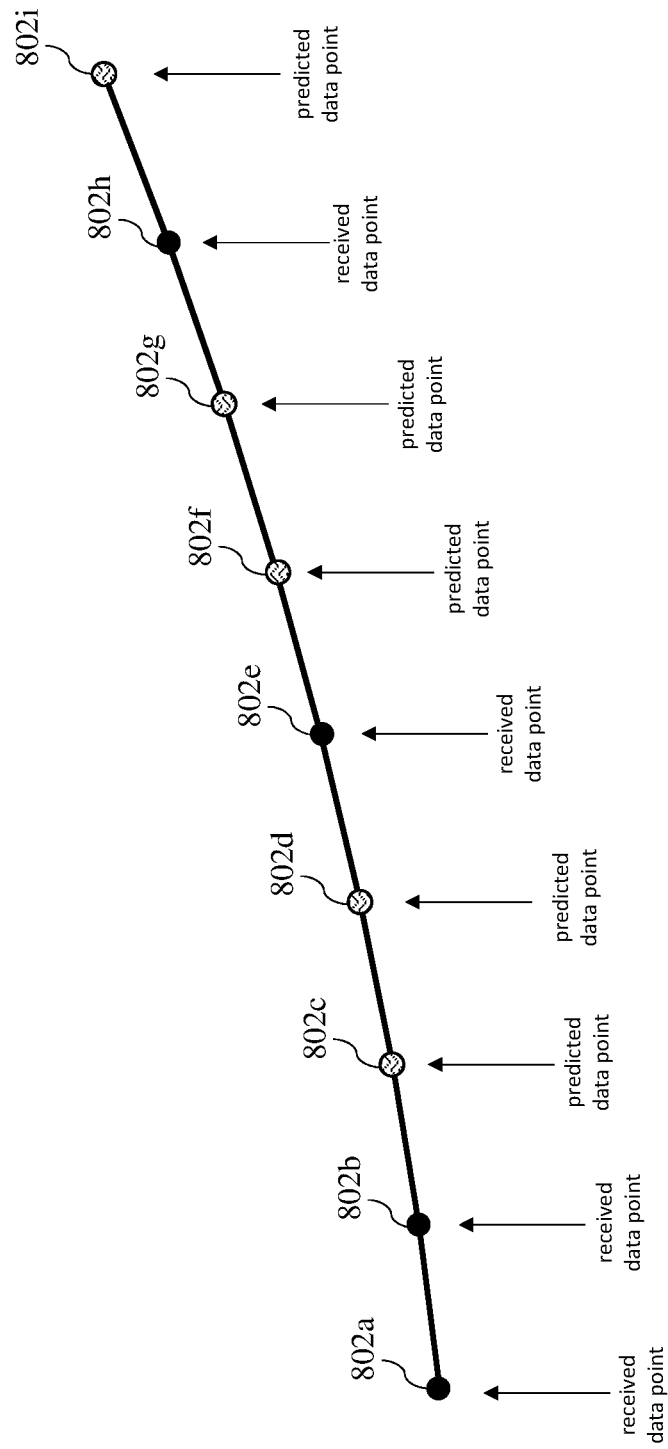
FIG. 8 shows an example movement of the pointer on the screen of the electronic device of FIG. 4.

FIG. 8 shows an example movement of the pointer through pixels 802a-802i on the screen of the electronic device 402. As shown in FIG. 8, the pixels 802a, 802b, 802e, 802h may correspond to coordinates of received data points from the wireless input device 402; whereas, the pixels 802c, 802d, 802f, 802g, 802i may correspond to coordinates of data points predicted by the predictor unit 608 of the receiver device 406.

In various embodiments, the first prediction function used by the prediction unit 506 of the wireless input device 404 and the second prediction function used by the predictor unit 608 of the receiver device 406 may be same functions with variable parameters (to be generated by the prediction unit 506 and the predictor unit 608 as described above). The predictions may be based on previous positions. The previous positions used by the prediction unit 506 may be the above-mentioned previous positions of the wireless input device 402 determined by the position determination unit 504 in previous time instances. The previous positions used by the predictor unit 606 may be the above-mentioned previous positions of the wireless input device 404 communicated to the electronic device 402 in previous time instances. In some embodiments, a number of previous positions used to generate the parameters for the first and second prediction functions may range from 10 to 20. In other words, no prediction may be carried out for the first 10 to 20 time instances after detecting a change in the state of the wireless input device 404. In some embodiments, the parameters of the first and second prediction functions may not be generated each time the position of the wireless input device 402 is predicted. Instead, the prediction unit 506 and/or the predictor unit 608 may use the same parameters over multiple time instances before generating new parameters.

In some embodiments, the first and second prediction functions may be same polynomial equations. For example, the first and second prediction functions may both be a first degree polynomial equation f(t) as shown in Equation (1) below, where a and b may be the variable parameters. In another example, the first and second prediction functions may both be a second degree polynomial equation as shown in Equation (2) below, where a, b and c may be the variable parameters. In yet another example, the first and second prediction functions may both be a third degree polynomial equation as shown in Equation (3) below, where a, b, c and d may be the variable parameters. However, the first and second prediction functions may be any suitable function as known to those skilled in the art.

$$f(t)=at+b \quad (1)$$

$$f(t)=at^2+bt+c \quad (2)$$

$$f(t)=at^3+bt^2+ct+d \quad (3)$$

In various embodiments, the prediction unit 506 of the wireless input device 404 may be configured to fit the previous positions into each of a plurality of polynomial equations (such as, but not limited to, the polynomial equations as shown in Equations (1)-(3)). The prediction unit 506 may then determine the polynomial equation which best fits the previous positions and selects this polynomial equation as the first prediction function. The fitting of the previous positions to each polynomial equation and the determination of the polynomial equation that best fits the previous positions by the prediction unit 506 may be performed using any technique as known to those skilled in the art.

In various embodiments, the predictor unit 608 of the receiver device 406 may also be configured to fit the previous positions into a plurality of polynomial equations (such as, but not limited to, the polynomial equations as shown in Equations (1)-(3)). The predictor unit 608 may then determine the polynomial equation which best fits the previous positions and selects this polynomial equation as the second prediction function. Since the previous positions used by the predictor unit 608 may be substantially similar to the previous positions used by the prediction unit 506, the selected polynomial equation for both the first and second prediction functions may be the same and the generated parameters may be substantially similar as well. The fitting of the previous positions to each polynomial equation and the determination of the polynomial equation that best fits the previous positions by the predictor unit 608 may also be performed using any technique as known to those skilled in the art.

As described above, in some embodiments, the predicted position of the wireless input device 404 may be communicated (at 732) to the electronic device 402 only if it is determined (at 730) that the prediction is successful. In some embodiments, the prediction may be considered successful if the average difference between the outputs calculated with the selected polynomial equation and the previous positions at the respective time instances is below a fit success threshold. For example, if the selected polynomial equation is that in Equation (1) i.e. f(t)=at+b, then the difference between the output $f(t_0)$ and the previous position at the time instance $t=t_0$, the difference between the output $f(t_0+1)$ and the previous position at the time instance $t=t_0+1$ and so on may be determined and the average of these differences may be calculated and compared against the fit success threshold to determine if the prediction is successful. However, other methods as known to those skilled in the art may be used to determine if the prediction is successful.

In various alternative embodiments, the first and second prediction functions may instead be same displacement equations. Each displacement equation may include a velocity parameter and an acceleration parameter. For example, the first and second prediction functions may both be the displacement equation as shown in Equation (4) below, where the final velocity $v_f$ and the acceleration a may be the variable parameters (velocity parameter and acceleration parameter) to be generated based on the previous positions.

For example, the initial velocity $v_i$ and the acceleration a may be determined using the previous positions and $v_f$ may then be determined using Equation (5). The final velocity $v_f$ may be the velocity the wireless input device 404 is at in the time instance immediately prior to the time instance for which the prediction may be performed.

$$s = v_i t + (\tfrac{1}{2}) a t^2 \quad (4)$$

$$v_f = v_i + at \quad (5)$$

For example, to predict a position of the wireless input device 404 at a time instance $t=t_0+10$, the initial velocity $v_i$ and the acceleration a may be determined using the previous positions at time instances $t_0, t_0+1, t_0+2, \ldots t_0+9$. The final velocity $v_f$ of the wireless input device 404 at $t=t_0+9$ may then be determined using Equation (5). This final velocity $v_f$ and the acceleration a may be used to predict a subsequent displacement s from the position of the wireless input device 404 at time $t_0+9$, and the position of the wireless input device 404 at time $t_0+10$ may then be predicted based on this displacement s. In some embodiments, each of the initial and final velocities $v_i$, $v_f$, acceleration a and displacement s has an x-component and a y-component. The x-component of the displacement s may be predicted using the x-components of the velocities $v_i$, $v_f$ and the acceleration a; and the y-component of the displacement s may be predicted using the y-components of the velocities $v_i$, $v_f$ and the acceleration a.

Movement of the wireless input device 404 by a user tends to follow a certain trajectory pattern over a short period of time (e.g. 10-50 ms). Therefore, the position of the wireless input device 404 may be predicted in a relatively accurate manner. By predicting the position of the wireless input device 404 and transmitting data to the receiver device 406 only when the difference between the predicted position and the determined position is greater than a similarity threshold, the amount of data transmitted from the wireless input device 404 to the receiver device 406 over time can be reduced. Accordingly, less power may be consumed by the apparatus 400. Further, as described above, the wireless input device 404 and the receiver device 406 may use a same function to predict the position of the wireless input device 404, where parameters of this function may be generated separately by the devices 404, 406 using substantially similar previous positions. Therefore, in the event that the receiver device 406 does not receive a data point from the wireless input device 404, the position predicted by the receiver device 406 may not differ from the position determined by the position determination unit 504 by more than the similarity threshold. In other words, the data used to control the pointer on the screen of the electronic device 402 may be substantially accurate even without transmission of data from the wireless input device 404 to the receiver device 406. Further, in embodiments where a predicted position may be communicated to the electronic device 402 whenever a position is not received from the wireless input device 404, the number of data points (e.g. 1000 data points) per second received by the electronic device 402 may not differ significantly from that in the case where all the determined positions are sent to the electronic device 402. Accordingly, the battery life of the wireless input device 404 may be increased without compromising on the integrity of the data used to control the pointer or the user experience.

The following examples pertain to further embodiments.

Example 1 is an apparatus for controlling a pointer on a screen of an electronic device, the apparatus including: a receiver device communicable with the electronic device and including a receiving unit and a communication unit; and a wireless input device including: a sensing unit configured to detect movement of the wireless input device; a position determination unit configured to determine a current position of the wireless input device in a current time instance based on the detected movement; a prediction unit configured to predict the current position of the wireless input device in the current time instance; a comparison unit configured to determine a difference between the determined current position and the predicted current position of the wireless input device, and further configured to determine if the difference is greater than a similarity threshold; and a transmitting unit configured to transmit the determined current position of the wireless input device to the receiver device in response to determining that the difference between the determined current position and the predicted current position of the wireless input device is greater than the similarity threshold; wherein the receiving unit of the receiver device may be configured to receive the determined current position of the wireless input device and the communication unit of the receiver device may be configured to communicate the received current position of the wireless input device to the electronic device to control the pointer on the screen of the electronic device.

In Example 2, the subject matter of Example 1 may optionally include that the prediction unit of the wireless input device may be configured to predict the current position of the wireless input device in the current time instance based on previous positions of the wireless input device determined by the position determination unit in a plurality of time instances prior to the current time instance.

In Example 3, the subject matter of Example 2 may optionally include that the prediction unit of the wireless input device may be configured to: generate parameters of a first prediction function based on the previous positions of the wireless input device determined by the position determination unit; and predict the current position of the wireless input device in the current time instance using the first prediction function with the generated parameters.

In Example 4, the subject matter of any one of Examples 1 to 3 may optionally include that the receiver device may further include: a data detection unit configured to determine if a subsequent position of the wireless input device in a subsequent time instance is received by the receiving unit from the wireless input device; and a predictor unit configured to predict the subsequent position of the wireless input device in the subsequent time instance; wherein in response to determining an absence of the receipt of the subsequent position of the wireless input device, the communication unit of the receiver device may be further configured to communicate the predicted subsequent position of the wireless input device to the electronic device to control the pointer on the screen of the electronic device.

In Example 5, the subject matter of Example 4 may optionally include that the predictor unit of the receiver device may be configured to predict the subsequent position of the wireless input device in the subsequent time instance in response to determining an absence of the receipt of the subsequent position of the wireless input device.

In Example 6, the subject matter of Example 4 or Example 5 may optionally include that the predictor unit of the receiver device may be configured to predict the subsequent position of the wireless input device based on previous positions of the wireless input device communicated to the electronic device in a plurality of time instances prior to the subsequent time instance.

In Example 7, the subject matter of Example 6 may optionally include that the predictor unit of the receiver device may be configured to: generate parameters of a second prediction function based on the previous positions of the wireless input device communicated to the electronic device; and predict the subsequent position of the wireless input device in the subsequent time instance using the second prediction function with the generated parameters.

In Example 8, the subject matter of any one of Examples 4 to 6 may optionally include that the prediction unit of the wireless input device may be further configured to predict the subsequent position of the wireless input device using a first prediction function; the predictor unit of the receiver device may be configured to predict the subsequent position of the wireless input device using a second prediction function; and the first prediction function and the second prediction function may be same functions with variable parameters.

In Example 9, the subject matter of Example 8 may optionally include that the first prediction function and the second prediction function may be same polynomial equations.

In Example 10, the subject matter of Example 8 may optionally include that the first prediction function and the second prediction function may be same displacement equations, and each displacement equation may include a velocity parameter and an acceleration parameter.

In Example 11, the subject matter of Example 10 may optionally include that the velocity parameter and the acceleration parameter for the first prediction function may be determined based on previous positions of the wireless input device determined by the position determination unit in a plurality of time instances prior to the subsequent time instance.

In Example 12, the subject matter of Example 10 or Example 11 may optionally include that the velocity parameter and the acceleration parameter for the second prediction function may be determined based on previous positions of the wireless input device communicated to the electronic device in a plurality of time instances prior to the subsequent time instance.

In Example 13, the subject matter of any one of Examples 1 to 12 may optionally include that the wireless input device may further include an input memory unit configured to store each position of the wireless input device determined by the position determination unit; and the prediction unit of the wireless input device may be further configured to use previously stored positions of the wireless input device from the input memory unit to predict the current position of the wireless input device, wherein the previously stored positions may be stored in time instances prior to the current time instance.

In Example 14, the subject matter of Example 13 may optionally include that the input memory unit may be further configured to store each position of the wireless input device predicted by the prediction unit.

In Example 15, the subject matter of any one of Examples 4 to 14 may optionally include that the receiver device may further include a receiver memory unit configured to store each position of the wireless input device received by the receiving unit; and wherein the predictor unit of the receiver device may be further configured to use previously stored positions of the wireless input device from the receiver memory unit to predict the subsequent position of the wireless input device, wherein the previously stored positions may be stored in time instances prior to the subsequent time instance.

In Example 16, the subject matter of Example 15 may optionally include that the receiver memory unit may be further configured to store each position of the wireless input device predicted by the predictor unit, and wherein the previously stored positions used to predict the subsequent position of the wireless input device may include previously predicted positions.

Example 17 is a wireless input device communicable with a receiver device, wherein the receiver device may be communicable with an electronic device and wherein the wireless input device may include: a sensing unit configured to detect movement of the wireless input device; a position determination unit configured to determine a current position of the wireless input device in a current time instance based on the detected movement; a prediction unit configured to predict the current position of the wireless input device in the current time instance; a comparison unit configured to determine a difference between the determined current position and the predicted current position of the wireless input device, and further configured to determine if the difference is greater than a similarity threshold; and a transmitting unit configured to transmit the determined current position of the wireless input device to the receiver device in response to determining that the difference between the determined current position and the predicted current position of the wireless input device is greater than the similarity threshold.

In Example 18, the subject matter of Example 17 may optionally include that the prediction unit may be configured to predict the current position of the wireless input device in the current time instance based on previous positions of the wireless input device determined by the position determination unit in a plurality of time instances prior to the current time instance.

In Example 19, the subject matter of Example 18 may optionally include that the prediction unit may be configured to: generate parameters of a first prediction function based on the previous positions of the wireless input device determined by the position determination unit; and predict the current position of the wireless input device in the current time instance using the first prediction function with the generated parameters.

In Example 20, the subject matter of any one of Examples 17 to 19 may optionally include that the wireless input device may further include an input memory unit configured to store each position of the wireless input device determined by the position determination unit; and wherein the prediction unit may be further configured to use previously stored positions of the wireless input device from the input memory unit to predict the current position of the wireless input device, wherein the previously stored positions may be stored in time instances prior to the current time instance.

In Example 21, the subject matter of Example 20 may optionally include that the input memory unit may be further configured to store each position of the wireless input device predicted by the prediction unit.

Example 22 is a receiver device communicable with a wireless input device and an electronic device, wherein the receiver device may include: a receiving unit configured to receive a current position of the wireless input device from the wireless input device; a communication unit configured to communicate the received current position of the wireless input device to the electronic device; a data detection unit configured to determine if a subsequent position of the wireless input device in a subsequent time instance is received by the receiving unit from the wireless input device; and a predictor unit configured to predict the subsequent position of the wireless input device in the subsequent time instance; wherein in response to determining an absence of the receipt of the subsequent position of the wireless input device, the communication unit may be configured to communicate the predicted subsequent position of the wireless input device to the electronic device.

In Example 23, the subject matter of Example 22 may optionally include that the predictor unit may be configured to predict the subsequent position of the wireless input device in the subsequent time instance in response to determining an absence of the receipt of the subsequent position of the wireless input device.

In Example 24, the subject matter of Example 22 or Example 23 may optionally include that the predictor unit may be configured to predict the subsequent position of the wireless input device based on previous positions of the wireless input device communicated to the electronic device in a plurality of time instances prior to the subsequent time instance.

In Example 25, the subject matter of Example 24 may optionally include that the predictor unit may be configured to: generate parameters of a second prediction function based on the previous positions of the wireless input device communicated to the electronic device; and predict the subsequent position of the wireless input device in the subsequent time instance using the second prediction function with the generated parameters.

In Example 26, the subject matter of any one of Examples 22 to 25 may optionally include that the receiver device may further include a receiver memory unit configured to store each position of the wireless input device received by the receiving unit; and wherein the predictor unit of the receiver device may be further configured to use previously stored positions of the wireless input device from the receiver memory unit to predict the subsequent position of the wireless input device, wherein the previously stored positions may be stored in time instances prior to the subsequent time instance.

In Example 27, the subject matter of Example 26 may optionally include that the receiver memory unit may be further configured to store each position of the wireless input device predicted by the predictor unit, and wherein the previously stored positions used to predict the subsequent position of the wireless input device may include previously predicted positions.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for".

The invention claimed is:

1. An apparatus for controlling a pointer on a screen of an electronic device, the apparatus comprising:
   a receiver device communicable with the electronic device and comprising a receiving unit and a communication unit; and
   a wireless input device comprising:
      a sensing unit configured to detect movement of the wireless input device;
      a position determination unit configured to obtain a determined current position of the wireless input device in a current time instance based on the detected movement;
      a prediction unit configured to predict a first predicted current position of the wireless input device in the current time instance;
      a comparison unit configured to determine a difference between the determined current position and the first predicted current position of the wireless input device, and further configured to determine if the difference is greater than a similarity threshold; and
      a transmitting unit configured to transmit the determined current position of the wireless input device to the receiver device in response to determining that the difference is greater than the similarity threshold, and transmit neither the determined current position nor the first predicted current position when the difference is not greater than the similarity threshold;
   wherein the receiving unit of the receiver device is configured to receive the determined current position of the wireless input device and the communication unit of the receiver device is configured to communicate the determined current position of the wireless input device to the electronic device to control the pointer on the screen of the electronic device, and communicate a second predicted current position of the wireless input device predicted by a predictor unit of the receiver device to the electronic device when the determined current position is not received from the wireless input device.

2. The apparatus of claim 1, wherein the prediction unit of the wireless input device is configured to predict the first predicted current position of the wireless input device in the current time instance based on previous positions of the wireless input device determined by the position determination unit in a plurality of time instances prior to the current time instance.

3. The apparatus of claim 2, wherein the prediction unit of the wireless input device is configured to:
   generate parameters of a first prediction function based on the previous positions of the wireless input device determined by the position determination unit; and
   predict the first predicted current position of the wireless input device in the current time instance using the first prediction function with the generated parameters.

4. The apparatus of claim 1, wherein the receiver device further comprises:
   a data detection unit configured to determine if the determined current position of the wireless input device is received by the receiving unit from the wireless input device; and
   the predictor unit configured to predict the second predicted current position of the wireless input device;
   wherein in response to determining an absence of the receipt of the determined current position of the wireless input device, the communication unit of the receiver device is further configured to communicate the second predicted current position of the wireless input device to the electronic device to control the pointer on the screen of the electronic device.

5. The apparatus of claim 4, wherein the predictor unit of the receiver device is configured to predict the second predicted current position of the wireless input device in response to determining an absence of the receipt of the determined current position of the wireless input device.

6. The apparatus of claim 4, wherein the predictor unit of the receiver device is configured to predict the second predicted current position of the wireless input device based on previous positions of the wireless input device communicated to the electronic device in a plurality of time instances prior to the current time instance; and wherein the predictor unit of the receiver device is configured to:
   generate parameters of a second prediction function based on the previous positions of the wireless input device communicated to the electronic device; and
   predict the second predicted current position of the wireless input device in the subsequent time instance using the second prediction function with the generated parameters.

7. The apparatus of claim 4,
   wherein the prediction unit of the wireless input device is further configured to predict the first predicted current position of the wireless input device using a first prediction function;
   wherein the predictor unit of the receiver device is configured to predict the second predicted current position of the wireless input device using a second prediction function; and
   wherein the first prediction function and the second prediction function are same functions with variable parameters.

8. The apparatus of claim 7, wherein the first prediction function and the second prediction function are same polynomial equations.

9. The apparatus of claim 7, wherein the first prediction function and the second prediction function are same displacement equations, each displacement equation comprising a velocity parameter and an acceleration parameter.

10. The apparatus of claim 9, wherein the velocity parameter and the acceleration parameter for the first prediction function are determined based on previous positions of the wireless input device determined by the position determination unit in a plurality of time instances prior to the current time instance.

11. The apparatus of claim 9, wherein the velocity parameter and the acceleration parameter for the second prediction function are determined based on previous positions of the wireless input device communicated to the electronic device in a plurality of time instances prior to the current time instance.

12. The apparatus of claim 1, wherein the wireless input device further comprises an input memory unit configured to store each position of the wireless input device determined by the position determination unit;
   wherein the prediction unit of the wireless input device is further configured to use previously stored positions of the wireless input device from the input memory unit to predict the first predicted current position of the wireless input device, wherein the previously stored positions are stored in time instances prior to the current time instance; and
   wherein the input memory unit is further configured to store each position of the wireless input device predicted by the prediction unit.

13. The apparatus of claim 4, wherein the receiver device further comprises a receiver memory unit configured to store each position of the wireless input device received by the receiving unit;
   wherein the predictor unit of the receiver device is further configured to use previously stored positions of the wireless input device from the receiver memory unit to predict the second predicted current position of the wireless input device, wherein the previously stored positions are stored in time instances prior to the current time instance; and
   wherein the receiver memory unit is further configured to store each position of the wireless input device predicted by the predictor unit, and wherein the previously stored positions used to predict the second predicted current position of the wireless input device comprise previously predicted positions.

14. A wireless input device communicable with a receiver device, wherein the receiver device is communicable with an electronic device and wherein the wireless input device comprises:
   a sensing unit configured to detect movement of the wireless input device;
   a position determination unit configured to obtain a determined current position of the wireless input device in a current time instance based on the detected movement;
   a prediction unit configured to predict a first predicted current position of the wireless input device in the current time instance;
   a comparison unit configured to determine a difference between the determined current position and the first predicted current position of the wireless input device, and further configured to determine if the difference is greater than a similarity threshold; and
   a transmitting unit configured to transmit the determined current position of the wireless input device to the receiver device in response to determining that the difference is greater than the similarity threshold, and transmit neither the determined current position nor the first predicted current position when the difference is not greater than the similarity threshold,
   wherein the receiver device is configured to communicate the determined current position of the wireless input device to the electronic device to control the pointer on the screen of the electronic device, and communicate a second predicted current position of the wireless input device predicted by a predictor unit of the receiver device to the electronic device when the determined current position is not received from the wireless input device.

15. The wireless input device of claim 14, wherein the prediction unit is configured to predict the first predicted current position of the wireless input device in the current time instance based on previous positions of the wireless input device determined by the position determination unit in a plurality of time instances prior to the current time instance; and wherein the prediction unit is configured to:
   generate parameters of a first prediction function based on the previous positions of the wireless input device determined by the position determination unit; and
   predict the first predicted current position of the wireless input device in the current time instance using the first prediction function with the generated parameters.

16. The wireless input device of claim 14, further comprising an input memory unit configured to store each position of the wireless input device determined by the position determination unit; and
   wherein the prediction unit is further configured to use previously stored positions of the wireless input device from the input memory unit to predict the first predicted current position of the wireless input device, wherein the previously stored positions are stored in time instances prior to the current time instance;
   wherein the input memory unit is further configured to store each position of the wireless input device predicted by the prediction unit.

17. A receiver device communicable with a wireless input device and an electronic device, wherein the receiver device comprises:
   a receiving unit configured to receive a determined current position of the wireless input device from the wireless input device, wherein the wireless input device is configured to transmit the determined current position when a difference between the determined current position and a first predicted current position of the wireless input device predicted by the wireless input device is greater than a similarity threshold, and transmit neither the determined current position nor the first predicted current position when the difference is not greater than the similarity threshold;
   a communication unit configured to communicate the determined current position of the wireless input device to the electronic device;
   a data detection unit configured to determine if the determined current position of the wireless input device is received by the receiving unit from the wireless input device; and
   a predictor unit configured to predict a second predicted current position of the wireless input device;
   wherein in response to determining an absence of the receipt of the determined current position of the wireless input device, the communication unit is configured to communicate the second predicted current position of the wireless input device to the electronic device.

18. The receiver device of claim 17, wherein the predictor unit is configured to predict the second predicted current position of the wireless input device in response to determining an absence of the receipt of the determined current position of the wireless input device.

19. The receiver device of claim 17, wherein the predictor unit is configured to predict the second predicted current position of the wireless input device based on previous positions of the wireless input device communicated to the electronic device in a plurality of time instances prior to the current time instance; and wherein the predictor unit is configured to:
   generate parameters of a second prediction function based on the previous positions of the wireless input device communicated to the electronic device; and
   predict the second predicted current position of the wireless input device using the second prediction function with the generated parameters.

20. The receiver device of claim 17, wherein the receiver device further comprises a receiver memory unit configured to store each position of the wireless input device received by the receiving unit;
   wherein the predictor unit of the receiver device is further configured to use previously stored positions of the wireless input device from the receiver memory unit to predict the second predicted current position of the wireless input device, wherein the previously stored positions are stored in time instances prior to the current time instance; and wherein the receiver memory unit is further configured to store each position of the wireless input device predicted by the predictor unit, and wherein the previously stored positions used to predict the second predicted current position of the wireless input device comprise previously predicted positions.

21. The apparatus of claim 1, wherein the communication unit of the receiver device is configured to communicate the second predicted current position to the electronic device when the determined current position is not received from the wireless input device and a prediction of position of the wireless input device is successful.

* * * * *